Oct. 21, 1969  H. BINGHAM  3,473,591
ANTI-SKID DEVICES
Filed June 26, 1967  2 Sheets-Sheet 1
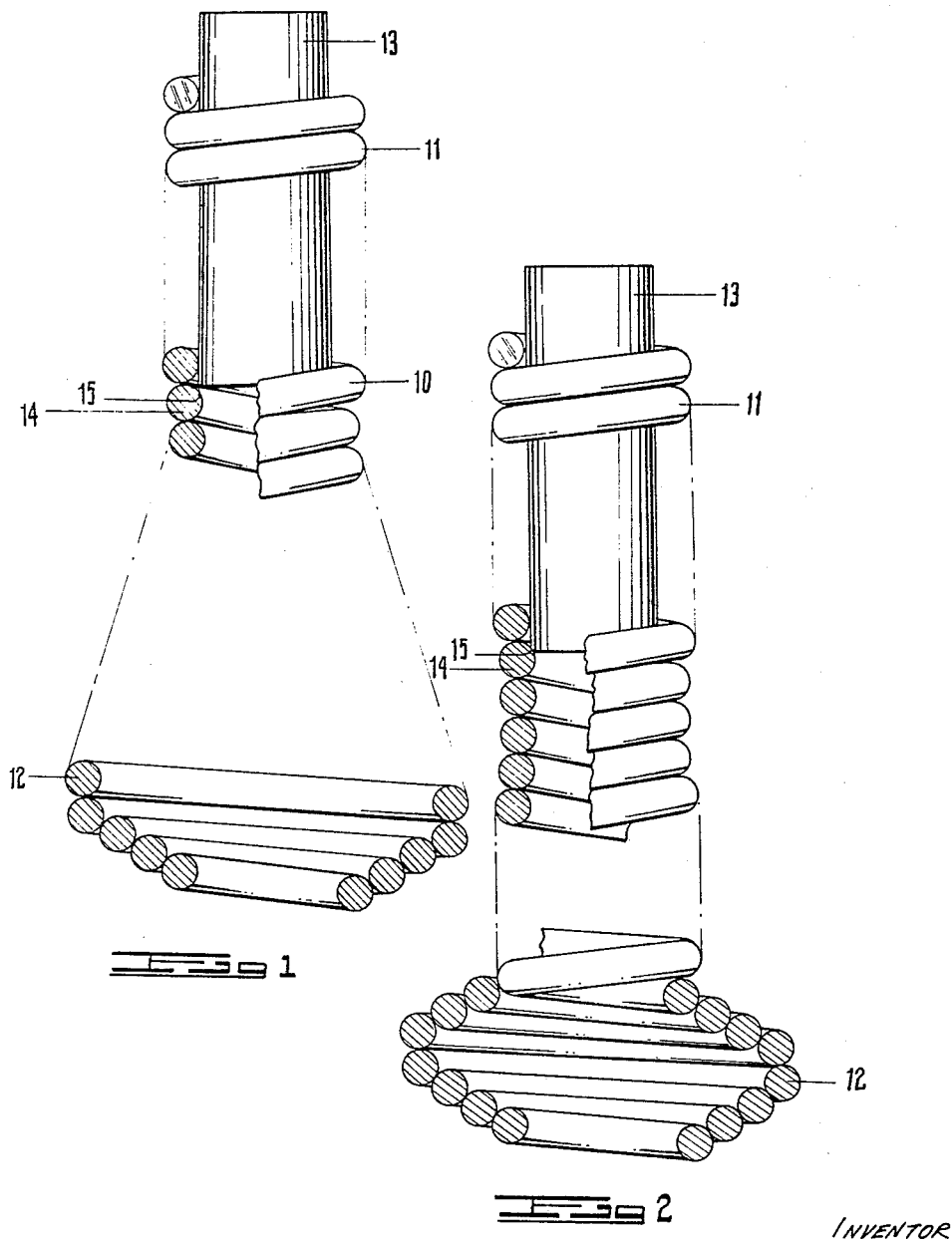
INVENTOR
HENRY BINGHAM
BY Young + Thompson
ATTYS.

Oct. 21, 1969    H. BINGHAM    3,473,591
ANTI-SKID DEVICES
Filed June 26, 1967    2 Sheets-Sheet 2
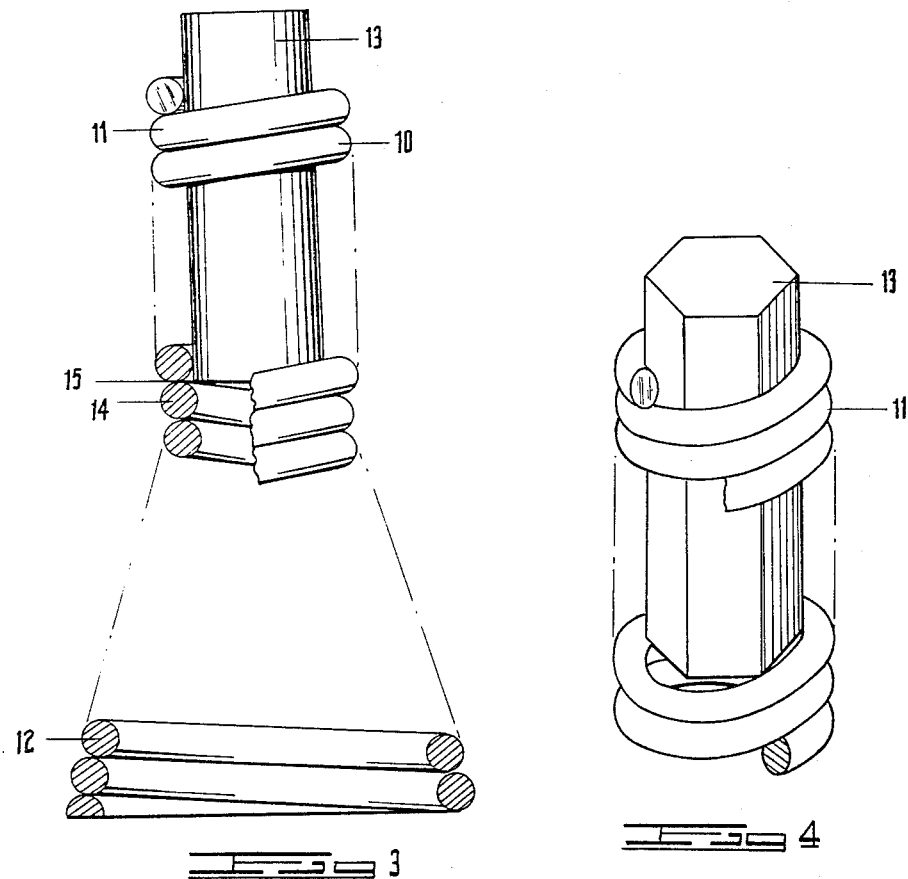
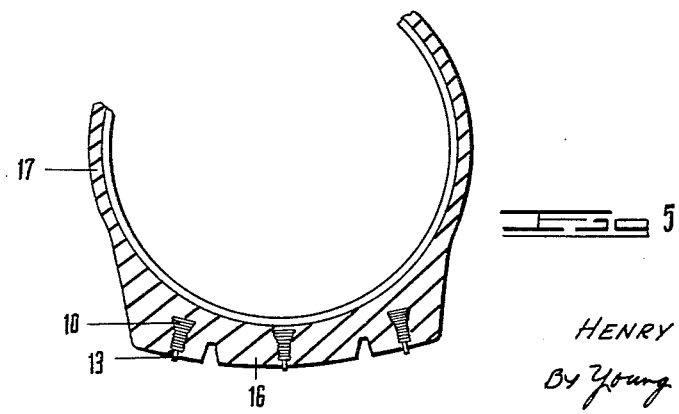
INVENTOR
HENRY BINGHAM
By Young + Thompson
ATTYS.

United States Patent Office 3,473,591
Patented Oct. 21, 1969

3,473,591
ANTI-SKID DEVICES
Henry Bingham, Springs, Transvaal, Republic of South Africa, assignor to Hard Metals Limited, Springs, Transvaal, South Africa
Filed June 26, 1967, Ser. No. 648,645
Claims priority, application Republic of South Africa, July 4, 1966, 66/3,939
Int. Cl. B60c 11/16, 11/20
U.S. Cl. 152—210      7 Claims

ABSTRACT OF THE DISCLOSURE

A stud for mounting in a motor car tire to improve traction and consisting of a short spring and a hard metal insert positioned in one end of the spring. The spring imparts resiliency to the stud and, in so doing, prevents detachment of the stud from the tire during movement thereof.

---

This invention relates to anti-skid devices for improving the traction of vehicular tires.

There are several known types of such devices but, in general, they all exhibit substantially the same construction, namely a solid plug-like body in one end of which a hard metal insert is mounted. A large number of such bodies is then fixed in the tread of a vehicular tire so that the inserts just protrude from the tread.

The solidity of the bodies gives rise to at least two disadvantages. Firstly it makes it expensive to treat all the tires on a vehicle and secondly there is a tendency, during movement of the vehicle, for the bodies to detach themselves from the tires.

It is an object of the present invention to provide an improved device of the type described in which the above-mentioned disadvantages have been substantially minimised.

A device according to the invention comprises an elongated coil spring adapted to be securely fixed to the tread of a tire and a hard metal insert adapted to be positioned in one end of the spring.

Further according to the invention a portion of the spring is formed with a reduced diameter to provide a seat for the insert.

To illustrate the invention various embodiments thereof are described hereunder with reference to the accompanying drawings in which:

FIGURE 1 is a side view (partly in section and with parts removed) of one form of the device, FIGURE 2 is a side view (partly in section and with parts removed) of a second form of the device, FIGURE 3 is a side view (partly in section and with parts removed) of a third form of the device, FIGURE 4 is a perspective view of one of the inserts, and FIGURE 5 is a section through a tire showing how the devices are used.

In FIGURE 1 an elongated coil spring 10 has an upper helical portion 11 and a lower double-tapered portion 12. As a result of the double taper, the lower portion 12 has a maximum diameter which is greater than that of the upper portion.

A hard metal plug 13, which is preferably made of tungsten carbide and which is in the shape of a solid cylinder, is located in the upper portion 11 of the spring 10. The diameter of the plug 13 is preferably slightly greater than the inner diameter of the upper portion 11 to allow the plug to be a force fit in the spring.

One of the coils 14 in the upper portion 11 is formed with a slightly reduced diameter to provide a seat 15 for the plug.

The device can be mounted in the tire tread in several ways and two methods in particular will be described.

Firstly a series of spaced holes can be drilled in the tread 16 of the tire 17 (see FIGURE 5) and the devices can be forced into these holes by any suitable method. The tapered end of the lower portion 12 facilitates the insertion of the plugs 13 into the holes and the increased diameter section enables the devices to be securely wedged in the holes.

Alternatively the devices can be moulded into the tire tread. It is a specific feature of the invention that, when this method is adopted, the rubber of the tread will flow into the cavity in the lower portion 12 and so fix the spring in the tire. If necessary this cavity could be filled with material having the same characteristics as the tire.

With either method the devices are so positioned in the tread that only the plugs 13 project from the tread, as can be seen in FIGURE 5.

FIGURE 2 shows a second embodiment of the invention in which the upper portion 11 is longer and the lower portion 12 is shorter than the embodiment illustrated in FIGURE 1.

In the embodiment illustrated in FIGURE 3 there is no double taper on the lower portion 12, only a single taper.

The cross-sectional shape of the insert could be circular or any other suitable shape. For example a hexagonal insert is illustrated in FIGURE 4.

The quantity of metal in a spring is considerably less than is required for a solid body having substantially the same shape as the spring. For this reason the cost of a device in accordance with the invention will be considerably less than the cost of one of the conventional devices of this type. Furthermore the spring provides a resiliency which helps to prevent the devices from being detached from the tire.

I claim:
1. An anti-skid device for improving the traction of vehicular tires comprising an elongated coil spring adapted to be securely fixed in the tread of a tire and a hard metal insert adapted to be positioned in one end of the spring.
2. The device as claimed in claim 1 in which a portion of the spring is formed with a reduced diameter to provide a seat for the insert.
3. The device as claimed in claim 1 in which the end portion of the spring remote from the insert is formed with an increased diameter to facilitate the fixing of the spring in the tread.
4. The device as claimed in claim 1 in which the end portion of the spring remote from the insert is tapered in cross-section to facilitate the insertion of the spring in the tread.
5. The device as claimed in claim 2 in which the end portion of the spring remote from the insert is formed with an increased diameter to facilitate the fixing of the spring in the tread.
6. The device as claimed in claim 2 in which the end portion of the spring remote from the insert is tapered in cross-section to facilitate the insertion of the spring in the tread.
7. The device as claimed in claim 5 in which the end portion of the spring remote from the insert is tapered in cross-section to facilitate the insertion of the spring in the tread.

References Cited
UNITED STATES PATENTS 3,124,191   3/1964   Forslund.
3,230,996   1/1966   Hakka.

ARTHUR L. LA POINT, Primary Examiner